Jan. 28, 1947.  L. K. RIGGS  2,414,837
MANUFACTURE OF CREAM PRODUCTS
Filed Nov. 17, 1943
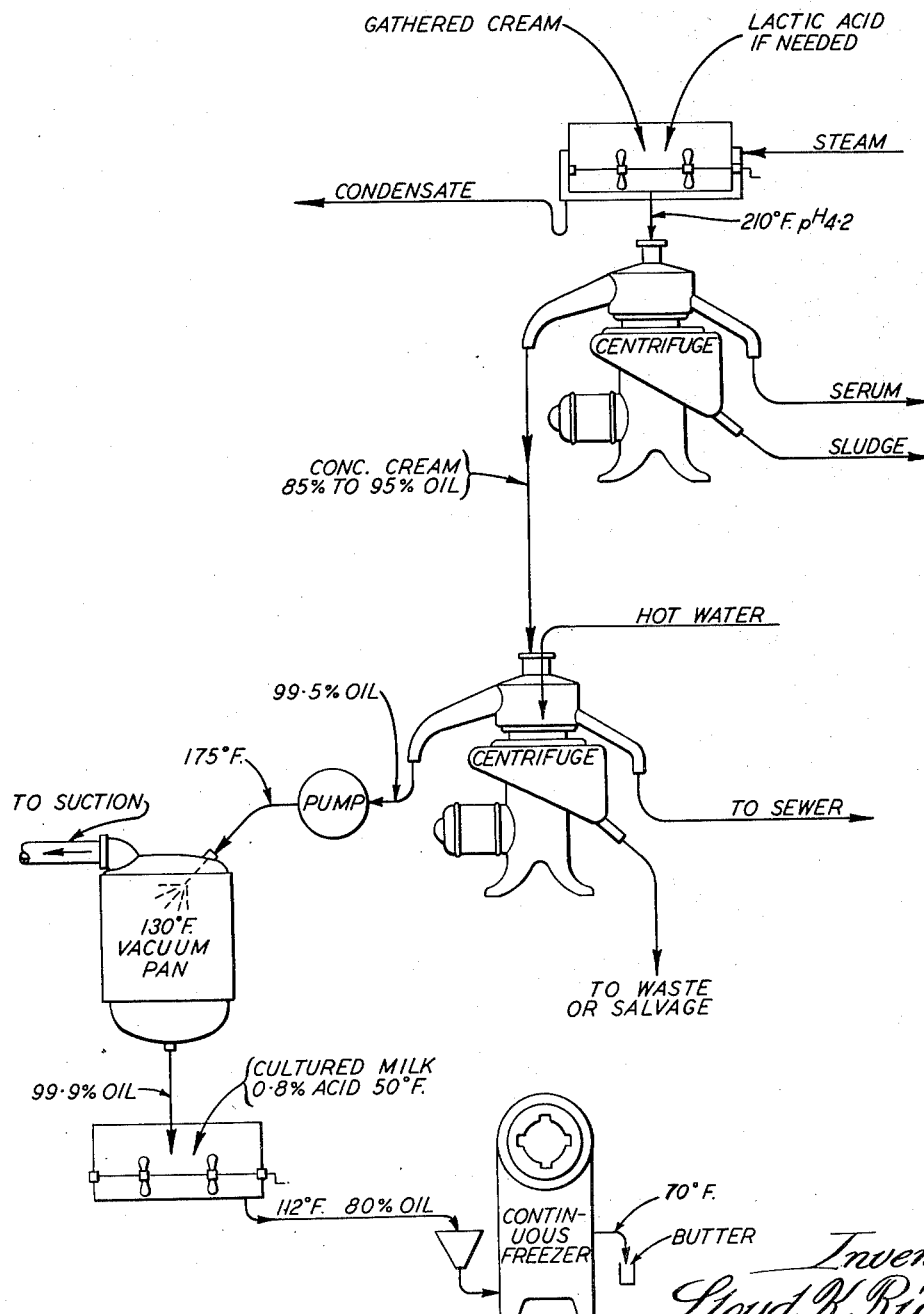

Patented Jan. 28, 1947

2,414,837

UNITED STATES PATENT OFFICE 2,414,837

MANUFACTURE OF CREAM PRODUCTS

Lloyd K. Riggs, Chicago, Ill., assignor to Kraft Foods Company, a corporation of Delaware Application November 17, 1943, Serial No. 510,581

6 Claims. (Cl. 99—62)

The invention relates to the manufacture of cream products and particularly to the utilization of dairy cream as the raw material for the manufacture of materials such as pure milk fat or butter by processes which do not require the step of churning or the equivalent.

In the case of cream, whether ordinary gathered cream or separated cream, the milk fat is present in the form of an emulsion, the fat constituting the discontinuous phase, whereas the serum or butter milk constitutes the continuous phase of the emulsion. The usual churning operation has the effect of destroying the original emulsion.

It has been generally recognized that, in order to make a high score butter from cream, the cream should be as fresh as possible. However, owing to the fact that milk fat as a constituent of cow's milk, is usually the product of relatively small dairy farms, often widely scattered, the collection of sufficiently large quantities of cream to satisfy the demands of large central creameries or butter factories inevitably requires a considerable amount of elapsed time between the milking of the cow and the final churning operation.

During this "gathering" period, the cream always deteriorates to a greater or less extent on account of bacterial and enzymic action. Harmful bacteria, if any are present, multiply. Acid-forming bacteria multiply and form lactic and other acids, and enzymic action produces free fatty acids. The presence of a certain amount of lactic acid is of advantage in the butter-making process, but the other results due to the bacterial or enzymic action are harmful and reduce the quality or "score" of the butter.

It is possible in a measure to destroy most of the harmful bacteria by pasteurization of the cream before churning, but the free fatty acids, which are a cause of off flavor or rancidity, can not be fully removed even when the butter in the churn is given repeated washing treatments.

In the manufacture of butter according to the customary methods, it is quite customary to pasteurize the cream to some extent in order to eliminate as far as possible the harmful bacteria or other deleterious factors. However, if the pasteurization is carried too far so that an effect approaching sterilization is obtained, the cream is likely to take on a burnt or scorched flavor which carries through and spoils the taste of the butter.

I am aware that various butter substitutes such as oleo-margarine have been made by treating a relatively pure oil or a combination of oils preferably by combining the oil with about 20% of other materials such as cultured liquid milk. However, so far as I am advised, it has never been considered practical to make butter by a process which involves first the production of a substantially pure milk fat, from cream, and second the treatment of the pure fat to produce butter as the end product.

Perhaps one reason for such failure has been the difficulty of obtaining pure milk fat from cream. Pure milk fat (in the form of butter oil) has been obtained from cream, but I believe only by an indirect method which involves first a churning operation to make butter and then treating the butter to extract the oil. This procedure is difficult and expensive and it is not economically feasible to use such material for making butter.

I have discovered a new, efficient, economical, and practical, method for obtaining pure milk fat direct from cream without churning. This improved milk fat process is employed in the first stage of my new process for making butter.

My new process for obtaining pure milk fat from cream involves at least two features of prime importance: First, a new process for producing by mechanical means an intermediate material containing a much higher percentage of milk fat than ordinary cream, and which is no longer in the same kind of emulsified condition as the original cream; and second, the further treatment of the intermediate de-emulsified material to raise the milk fat concentration to a point where it may be said that the milk fat is substantially or practically pure, i. e., (free from serum solids and moisture).

General method

The invention, if viewed as an improved process for the manufacture of milk fat, contemplates a preliminary treatment of sweet or gathered cream which will adapt the material for de-emulsification. This treatment preferably involves heating the batch to a temperature well above the melting point of milk fat and approaching 180° F. or more. Then by mechanical concentration, for example, by means of a high-speed centrifuge, there is produced a de-emulsified material containing a very large percentage of milk fat, for example as high as 80% to 90% or even more.

This de-emulsified concentrated intermediate material, while in still heated condition, is again centrifuged to produce an oil which contains about 99% or more of milk fat.

When it is found to be desirable to wash out any undesired free fatty acids or other unwanted substances, the wash water is heated and preferably separately introduced into the bowl of the second centrifuge and in a separate stream. In this way undesired re-emulsification is prevented. If, for any reason, it is found necessary or desirable to add water before the material is fed into the second centrifuge, a sufficient quantity of a suitable innocuous emulsion inhibitor, for example fuller's earth, may be incorporated with the material along with the added water.

The product of the second centrifuge is an oil containing about 99% of milk fat. If desired, most of the remaining moisture may be removed by a short conventional vacuum pan treatment. To make butter, this milk fat is then combined with about 20% of cultured milk containing the desired acid and flavor factors and is stirred and cooled, preferably quite rapidly, whereby there is formed a body of plastic material. When this material has been cooled sufficiently and preferably hardened by super cooling, it is ready for shipment. The finished material has all the physical and chemical properties of the best butter. It is butter.

*Specific example*

The invention will be better understood when considered in connection with the drawing accompanying this application, which drawing shows in diagrammatic form a flow sheet of the process beginning with the cream and ending with the production of commercial butter.

The invention will be described in connection with the conversion of 400 lbs. of ordinary sweet cream containing 40% milk fat into about 200 lbs. of butter containing at least 80% of milk fat, which is the standard for butter in the United States.

The first step is to place all the cream into a jacketed tank having suitable stirring arrangements. Also, there is added whatever additional water may be needed to thoroughly rinse the cans and remove any adherent cream. This will represent about 95 lbs. of additional water added to the cream. In addition thereto, if the pH of the cream is more than about 4.6, there is also added sufficient acidic material to reduce the pH to about 4.2. If the pH of the cream is about 6.5, this will require an amount of acid equivalent to about 850 c. c. of 85% lactic acid dissolved in about 15 lbs. of water. When all of these materials have been mixed together in the first mixing tank, the pH should be between 3.8 and 4.8, preferably about 4.2. The stream is turned into the jacket and after about 30 to 40 minutes, during which stirring is continued, the temperature of the cream rises considerably above the melting point of milk fat, preferably above 180° F., in fact as close to 212° F. as is commercially feasible. A good working temperature may be 210° F. The hot material is then put through a high-speed centrifuge. We have gotten good results by using a De Laval separator of the industrial model ADRO type, operating at 6,000 R. P. M., nominal capacity 300 gals. per hour, having in addition to the usual cream and serum discharges a separate discharge for the so-called sludge which contains most of the casein or other proteins.

It will be understood that, before the prepared cream is passed through the centrifuge, the latter is preferably heated up to at least 180° F. by running hot water through the machine.

From the cream outlet of the centrifuge, there flows about 190 lbs. of material containing from 80% to 95% of milk fat, and the original emulsion is found to be broken. If the temperature of this de-emulsified material has fallen off to any extent, it may be reheated, preferably in a continuous type heater.

After the temperature of the material has again been restored to at least 180° F. (if necessary), it is run through another continuous centrifuge of substantially the same type and size as that used in the first centrifuging stage.

I have discovered that, for the purpose of reducing the amount of free fatty acids and other undesired substances, hot wash water may be introduced into the centrifuge by a separate inlet pipe extending down into the bowl, so that the dilution water does not mingle with the intermediate material until both streams of liquid approach the bottom of the bowl of the centrifuge. Under these conditions, the original emulsion will not be reformed. The wash water should be heated to a temperature of, say, 180° F.

After the separated washed milk fat (99.5% pure) has been discharged from the second centrifuge, it is advisable in most cases, as a further precautionary measure, to remove most of the remaining water by giving it a vacuum treatment. To this end it is pumped and sprayed into the top of a vacuum pan, the degree of vacuum (about 28 inches of mercury) corresponding to a saturated steam temperature of about 130° F. This vacuum treatment serves to remove practically all of the remaining water and other volatile material carried by the fat, so that, by the time is is discharged from the vacuum pan, it is about 99.9% pure milk fat.

I have previously prepared a supply of pure fresh skim milk or whole milk which has been carefully pasteurized at a temperature of about 180° F. for 30 minutes and then cultured with pure cultures of S. Para-Citrovorus and S. Citrovorus for developing the necessary flavor, and with S. Lactis for producing the necessary acidity. Before introducing these cultures, the skim milk has been reduced in temperature to 72° F. and is held at that temperature until the required bacterial action has occurred. This will usually take about 16 hours, at the end of which time the acidity expressed in terms of lactic acid has risen to about .8%.

40 lbs. of this cultured milk are put into a tank along with the 160 lbs. of pure milk fat and subjected to sufficient mixing to distribute the cultured milk thoroughly through the mass of fat. The mixture contains at least 80% of milk fat.

At this stage, if salted butter is required as the final product, the desired amount of salt may be introduced into the mixing tank, the amount of cultured milk being suitably reduced.

When the temperature of the combined liquid has dropped to about 112° F., it is put through a continuous freezer of the type which is usually employed for making ice-cream or sherbet and which is equipped with the customary mixing or stirring devices. The flow of material through the continuous freezer is adjusted to the point where the temperature of the material flowing out of the freezer is not more than about 70° F., preferably lower. A temperature as low as 50° F. has given good results.

If desired, the product flowing from the continuous freezer can be introduced directly into suitable shipping receptacles. According to the usual practice, the filled receptacles are put into a cold room at a temperature considerably below the freezing point, and, as soon as the butter is hardened, it is available for shipment and sale.

Butter made in accordance with the above procedure is of great purity. It is free from objectionable odors. It possesses in high degree all of the advantageous taste factors normally present in the finest butter, and the body and texture of the material also are equal to those of the best churned butter.

The process, although described as a batch process, is obviously capable of being organized for continuous operation. As compared with the floor space required for the equipment used in the usual churning process, the amount of equipment and the amount of floor space occupied thereby which is used in practicing my improved butter-making process is greatly reduced. Furthermore, the labor required is only a fraction of that which is required in the ordinary churning process, and there is no contamination of the butter through contact with the human person.

At the present time, there is an unsatisfied demand for pure milk fat, particularly for shipment overseas. For shipping and storage purposes, pure milk fat has some advantages over milk products containing less than 100% of milk oil, for example butter, for the reason that butter contains only 80% of milk fat and also is more susceptible to spoilage than is pure sterilized milk fat. However, up to the present time, the demand for pure milk fat could only be satisfied by producing it from butter. This involves not only the entire expense of making butter as such, but the additional expense of the further treatment in melting the butter and recovering and purifying its fat content.

The advantages of my process of producing milk fat as compared with prior art processes are quite apparent.

The scope of the invention is to be determined by reference to the appended claims.

I claim:

1. The improved step in the process of making milk fat from cream which comprises adjusting the acidity of cream to about 3.8 to 4.8 pH, raising its temperature to at least about 180° F., and then centrifuging the heated acid cream so as to break the original emulsion and produce a material containing from 80 to 95% of milk fat.

2. The improved step in the process of making milk fat which comprises adjusting the acidity of cream to about 4.2 pH and also raising the temperature to about 200° F., and then centrifuging the heated cream so as to break the original emulsion and produce a material containing from 80% to 95% of milk fat.

3. The improved process of making milk fat which comprises adjusting the acidity of cream to 3.8 to 4.8 pH and also raising its temperature to at least about 180° F., then centrifuging the heated cream so as to break the original emulsion and produce a material containing from 80% to 95% of milk fat, while substantially maintaining the temperature of the material, and centrifuging the heated material so as to produce a liquid containing about 99% of milk fat.

4. The improved process of making milk fat which comprises adjusting the acidity of cream to about 3.8 to 4.8 pH and also raising the temperature to at least 180° F., then centrifuging the heated cream so as to break the original emulsion and produce an intermediate material containing about 80% to 95% of milk fat, substantially maintaining the temperature of said material, and then centrifuging the heated material in the presence of hot water so as to produce a liquid containing about 99% of milk fat.

5. The improved process of making milk fat which comprises adjusting the acidity of gathered cream of about 40% milk fat content to about 4.2 pH and also raising the temperature to about 200° F., then centrifuging the heated cream so as to break the original emulsion and produce a material containing about 90% of milk fat, substantially maintaining the temperature of said material, and immediately centrifuging the heated material so as to produce a liquid containing about 99% of milk fat.

6. The improved process of making milk fat which comprises adjusting the acidity of cream to about 3.8 to 4.8 pH and also raising the temperature to at least about 200° F., then centrifuging the heated cream so as to produce an intermediate material containing from 80% to 95% of milk fat, substantially maintaining the temperature of said material, diluting said material with hot water, preventing the re-emulsification of the intermediate by incorporating with the material an emulsion inhibitor, and centrifuging the diluted intermediate so as to produce a liquid containing up to 99.5% of milk fat.

LLOYD K. RIGGS.